C. E. SINGLETON.
TIRE TOOL.
APPLICATION FILED JAN. 30, 1919.

1,352,550.

Patented Sept. 14, 1920.
3 SHEETS—SHEET 1.

Inventor
Clifton E. Singleton
By his Attorney

C. E. SINGLETON.
TIRE TOOL.
APPLICATION FILED JAN. 30, 1919.

1,352,550.  Patented Sept. 14, 1920.
3 SHEETS—SHEET 2.

Inventor
Clifton E. Singleton
By his Attorney
Paul V Beeker

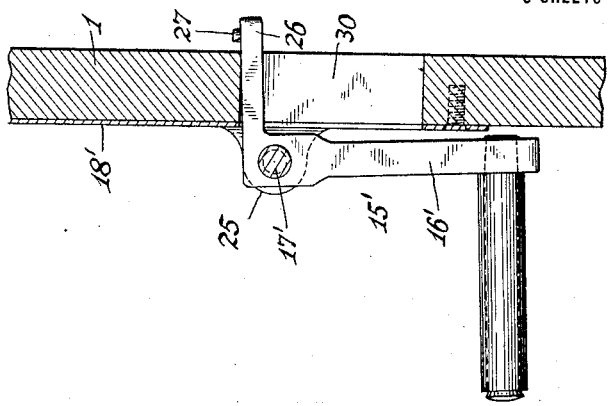
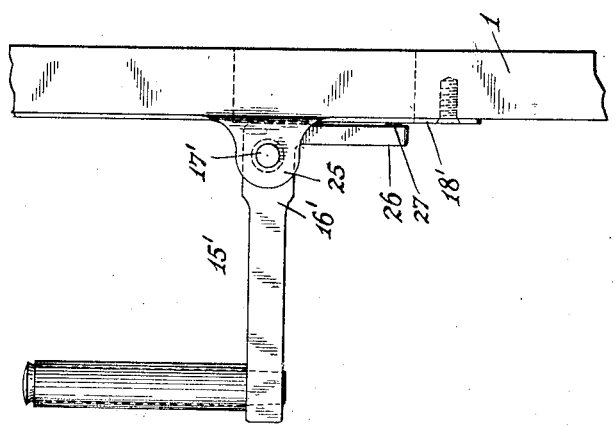
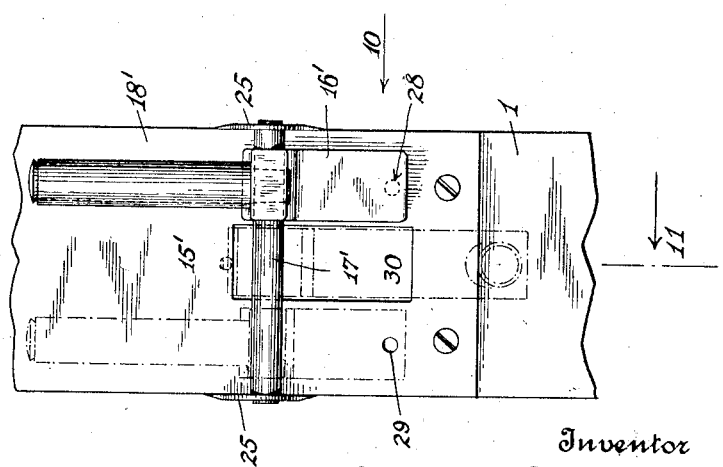

UNITED STATES PATENT OFFICE.

CLIFTON E. SINGLETON, OF BROOKLYN, NEW YORK.

TIRE-TOOL.

1,352,550.  Specification of Letters Patent.  Patented Sept. 14, 1920.

Application filed January 30, 1919. Serial No. 273,962.

*To all whom it may concern:*

Be it known that I, CLIFTON E. SINGLETON, a citizen of the United States, and a resident of the borough of Brooklyn, in the city of New York, county of Kings, and State of New York, have invented certain new and useful Improvements in Tire-Tools, of which the following is a specification.

The present invention relates generally to tire tools of the character employed in mounting a tire on the rim of an automobile or bicycle wheel and has for its object simple and expeditious means for performing this work.

The invention consists principally in a tire stretching member which enters between the tire and the rim and a tire guiding member that engages with the side of the tire to move it into the plane of the rim, together with means for effecting a relative rotation of the tire and rim as one element with respect to the stretching and guiding members as another element. In the present form, the wheel is mounted rotatably while the stretching and guiding members are relatively stationary.

In the accompanying drawings:

Fig. 9 is a view similar to the lower part of Fig. 6, showing a modified form of the invention.

Fig. 10 is a view looking in the direction of arrow 10 of Fig. 9.

Fig. 11 is the vertical sectional view on the line 11—11 of Fig. 9.

Figure 1:
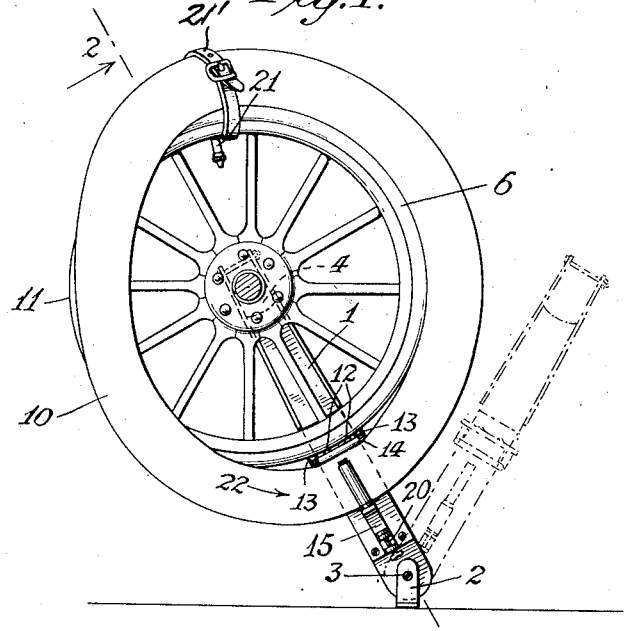
Figure 1 is a general view, in elevation, of a device embodying one concrete and preferred form of the invention showing the tire partly on the rim.

As here shown, 1 indicates a support or arm having the pedestal 2 pivotally attached thereto at 3 so that the arm may assume an inclined position in either direction as indicated in full and dotted lines in Fig. 1. At the upper end of the arm is a bearing 4 for the reception of the hub 5 of a wheel 6. In the case of a hollow hub such as used in motorcycle wheels, a spindle 7 may be used which may be inserted in any one of a number of openings 8 in said arm.

At its lower end the arm 1 is provided with a tire stretching member 9 that projects laterally and enters between the tire 10 and rim 11. This member has antifriction means consisting of two rollers 12 that engage the rim peripherally, two rollers 13 at an angle thereto for engaging the side of the rim, and two rollers 14 that engage the inside of the tire.

Figure 2:
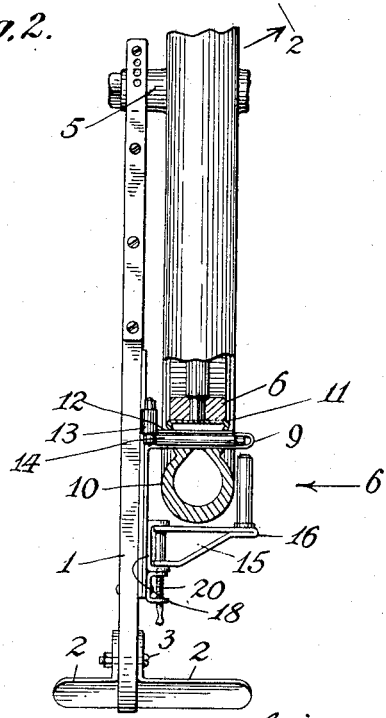
Fig. 2 is a view on the line 2—2 of Fig. 1 with the tire completely on the rim and with parts in section.
Figure 4:
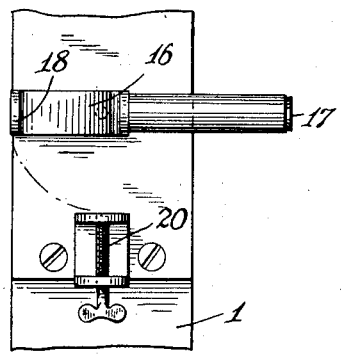
Fig. 4 is a front elevation of the parts shown in Fig. 3 with the tire guiding member in position to admit or remove tire and rim.
Figure 5:
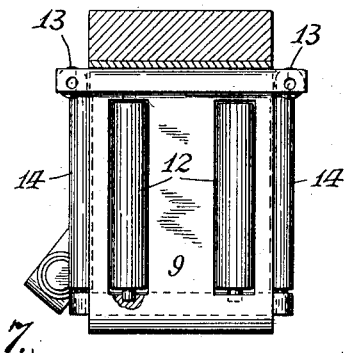
Fig. 5 is a sectional view on the line 5—5 of Fig. 6 showing more particularly the tire stretching means.

The arm 1 is also provided with a guiding member 15 for engaging with the side of the tire to move it into the plane of the rim. This member 15 is provided with an anti-friction roller mounted on the carrier 16 pivotally supported at 17, said carrier being in turn mounted on a swinging bracket 18 pivotally supported at 19 at right angles to 17 so that 15 may be swung out of the way, as in Fig. 4. When in normal position, as in Fig. 2, the threaded stem 20 enters bracket 18 and prevents it from swinging.

Figure 3:
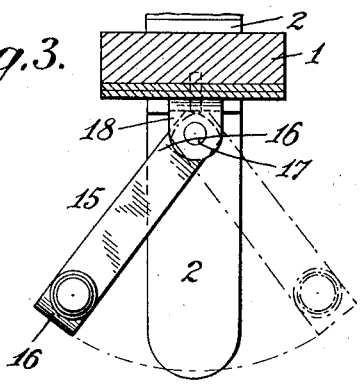
Fig. 3 is a sectional view on the line 3—3 of Fig. 6 showing the tire guide.
Figure 6:
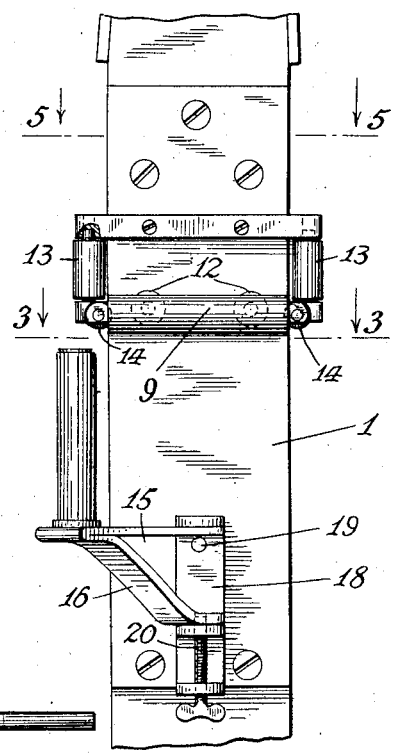
Fig. 6 is a view looking in the direction of the arrow 6 of Fig. 2.
Figure 7:
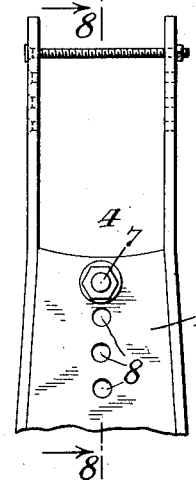
Fig. 7 is a detail view in elevation of the upper end of the support, showing the bolt for a bicycle wheel in one of the adjusted positions.
Figure 8:
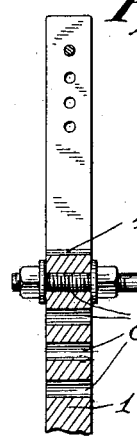
Fig. 8 is a sectional view on the line 8—8 of Fig. 7.

The tire is placed in the rim and a valve 21 inserted therethrough in a known manner, means such as a strap 21' being used to hold the tire in position. The wheel is then placed on the support with the stretching member inserted between the tire and rim and with the guiding member adjacent the tire, as in Fig. 1. The operator will then place his feet on the pedestal with the wheel between his legs. He will then rotate the wheel in the direction indicated by the arrow 22 in Fig. 1 and the tire will be slipped on the rim. In carrying out this operation, the guiding member will swing on its pivotal support 17, as indicated in Figs. 3 and 6, depending upon the direction of rotation and will guide the tire into the rim. The member 20 is now manipulated and the bracket 18 swung as in Fig. 4, thereby admitting of the removal of the wheel from the support.

The arm 1 may be inclined into either of the positions shown in Fig. 1 depending upon the direction in which the hub 5 extends.

In Figs. 9, 10 and 11 a modified form of tire guiding member is shown. Here the anti-friction roller mounted on guiding member 15' is carried by an arm 16' laterally slidable and pivotally supported on pivot 17'. Pivot 17' is supported by ears or bearings 25 carried by plate 27 which latter is secured to the main support 1. Member 15' carries an extension 26 that is adapted to pass through opening 30 of support 1 when said member occupies a position in alinement with said opening (Fig. 11) and it will be understood that when the parts are in this position the tire and rim may be readily inserted in or removed from the device. During the operation of attaching the tire to the rim, member 15' will occupy a position either on one side or the other of opening 30, depending upon the direction in which hub 5 extends, and will therefore be in the upright position indicated in Fig. 10, the projection 28 engaging in opening 29 to prevent lateral displacement of said member.

I claim:

1. A tire tool comprising: an arm adapted to be rotatably supported by the hub of a wheel, a tire stretching member supported on said arm for entry between the tire and rim of the wheel, anti-friction members one for peripheral engagement with the rim, one for engagement with the inside of the tire and one for engagement with the side of the rim all carried by said tire stretching member and a tire guiding member engaging with the side of the tire to move the latter into the plane of the rim.

2. A tire tool comprising: an arm adapted to be rotatably supported by the hub of a wheel, a tire stretching member supported on said arm for entry between the tire and rim of the wheel, anti-friction members, one for peripheral engagement with the rim, one for engagement with the inside of the tire and one for engagement with the side of the rim all carried by said tire stretching member and a tire guiding member engaging with the side of the tire opposite to the side of the wheel engaged by the last mentioned rim engaging anti-friction member to move the tire into the plane of the rim.

3. A tire tool comprising: an arm adapted to be rotatably supported by the hub of a wheel, a tire stretching member supported on said arm for entry between the tire and rim of the wheel, anti-friction members, a plurality for peripheral engagement with the rim, a plurality for engagement with the inside of the tire and a plurality for engagement with the side of the rim all carried by said tire stretching member and a tire guiding member engaging with the side of the tire to move the latter into the plane of the rim.

4. A tire tool comprising: a tire stretching member, for entry between the tire and the rim, a tire guiding member engaging with the side of the tire to move the latter into the plane of the rim, a supporting arm, means for adjusting the tire guiding member laterally with respect to the supporting arm and means admitting of a pivoted movement of the tire guiding member to release the wheel.

5. A tire tool comprising: an arm adapted to be rotatably supported by the hub of a wheel, a tire stretching member supported on said arm for entry between the tire and rim of the wheel, anti-friction members, one for peripheral engagement with the rim, one for engagement with the inside of the tire and one for engagement with the side of the rim all carried by said tire stretching member, a tire guiding member engaging with the side of the tire to move the latter into the plane of the rim, means for adjusting the tire guiding member laterally with respect to the said arm and means admitting of a pivotal movement of the tire guiding member to release the wheel.

Signed at New York city, in the county of Kings and State of New York, this 21 day of Dec., 1918.

CLIFTON E. SINGLETON.